(12) United States Patent
Slik et al.

(10) Patent No.: US 7,546,486 B2
(45) Date of Patent: Jun. 9, 2009

(54) SCALABLE DISTRIBUTED OBJECT MANAGEMENT IN A DISTRIBUTED FIXED CONTENT STORAGE SYSTEM

(75) Inventors: David Slik, Brackendale (CA); Oliver Seiler, Vancouver (CA); Markus Lampert, Burnaby (CA); Mike Montour, Vancouver (CA)

(73) Assignee: Bycast Inc., Vancouver, BC (CA)

( * ) Notice: Subject to any disclaimer, the term of this patent is extended or adjusted under 35 U.S.C. 154(b) by 471 days.

(21) Appl. No.: 11/511,686

(22) Filed: Aug. 28, 2006

(65) Prior Publication Data

US 2008/0126404 A1   May 29, 2008

(51) Int. Cl.
G06F 11/00 (2006.01)
(52) U.S. Cl. .................................... 714/15; 707/103 R
(58) Field of Classification Search .................. 714/15, 714/16, 20; 707/103 R, 103 X
See application file for complete search history.

(56) References Cited

U.S. PATENT DOCUMENTS

| | | | |
|---|---|---|---|
| 5,428,769 A | | 6/1995 | Glaser et al. |
| 5,504,883 A | | 4/1996 | Coverston et al. |
| 5,729,738 A | * | 3/1998 | Watanabe et al. ....... 707/103 R |
| 5,806,075 A | | 9/1998 | Jain et al. |
| 5,845,080 A | * | 12/1998 | Hamada et al. ............. 709/224 |
| 5,890,156 A | | 3/1999 | Rekieta et al. |
| 6,779,082 B2 | * | 8/2004 | Burger et al. ............... 711/114 |
| 2003/0149709 A1 | | 8/2003 | Banks |
| 2004/0139222 A1 | | 7/2004 | Slik et al. |
| 2005/0021566 A1 | | 1/2005 | Mu |
| 2005/0120025 A1 | * | 6/2005 | Rodriguez et al. ............ 707/10 |
| 2005/0195660 A1 | * | 9/2005 | Kavuri et al. .......... 365/189.05 |
| 2005/0246311 A1 | * | 11/2005 | Whelan et al. ................. 707/1 |
| 2006/0004689 A1 | * | 1/2006 | Chandrasekaran et al. ...... 707/1 |
| 2006/0004820 A1 | | 1/2006 | Claudatos et al. |
| 2006/0026219 A1 | | 2/2006 | Orenstein et al. |
| 2006/0053262 A1 | | 3/2006 | Prahlad et al. |
| 2006/0080362 A1 | | 4/2006 | Wagner et al. |
| 2007/0094316 A1 | * | 4/2007 | Rodriguez et al. .......... 707/205 |
| 2007/0294310 A1 | * | 12/2007 | Yagawa ...................... 707/200 |

FOREIGN PATENT DOCUMENTS

WO   WO 2004/104866 A2   12/2004

OTHER PUBLICATIONS

D. Manivannan, et al., A Decentralized token Generation Scheme for Token-Based Mutual Exclusion Algorithms, *International Journal of Computer Systems Science and Engineering* 11(1):45-54, Jan. 1996.

(Continued)

*Primary Examiner*—Dieu-Minh Le
(74) *Attorney, Agent, or Firm*—Knobbe, Martens, Olson & Bear, LLP

(57) ABSTRACT

A method and apparatus for the management of the placement of immutable fixed-content objects in a distributed, multi-site, multi-tier non-volatile storage hierarchy consisting of a plurality of storage media connected together over networks of varying bandwidth where the computing, storage, and network resources are subject to failure. The disclosure provides for scalability, performance, and robustness by distributing the object placement management tasks amongst a plurality of computing resources and eliminating the need for global synchronization or locking amongst said computing resources.

44 Claims, 6 Drawing Sheets

OTHER PUBLICATIONS

Daniel Herman, *Towards a Systematic Approach to Implement Distributed Control of Synchronization,* Distributed Computing Systems, 1983 pp. 50-51, 54-55.

Wesley W. Chu, et al., *The Exclusive-Writer Protocol: A Low Cost Approach For Updating Replicated Files in Distributed Real Time Systems,* Proc. 3rd Int. Conf. Distrib. Comput. Syst., Oct. 1982, pp. 219-220.

Springer Study Edition, *Lecture Notes in Computer Science,* vol. 105, 1981.

Milan Milenkovic, *Update synchronization in multiaccess systems,* Distributed database systems; No. 8, 1979, pp. 2-3; 8-11; 32-35.

David Slik, et al., *Scalable fault tolerant image communication and storage grid,* SPIE USE, V.2 5033-7, Jan. 17, 2003.

Keith Ma, et al., *Web-based Monitoring and Management System for Integrated Enterprise Wide Imaging Networks,* Medical Imaging 2003: PACS and Integrated Medical Information Systems: Design and Evaluation; SPIE vol. 5033 pp. 160-171.

David Slik, et al., *A Comprehensive Security Framework for the Communication and Storage of Medical Images,* Medical Imaging 2003: PACS and Integrated Medical Information Systems: Design and Evaluation, SPIE vol. 5033 pp. 212-223.

International Search Report and Written Opinion of related patent application No. PCT/IB2007/004346 dated Sep. 9, 2008—11 pages.

* cited by examiner

SCALABLE DISTRIBUTED OBJECT MANAGEMENT IN A DISTRIBUTED FIXED CONTENT STORAGE SYSTEM

BACKGROUND

A fixed-content object is a container of digital information that, once created, remains fixed. Examples of objects that could be fixed include medical images, PDF documents, photographs, document images, static documents, financial records, e-mail, audio, and video. Altering a fixed-content object results in the creation of a new fixed-content object. A fixed-content object once stored becomes immutable.

Fixed-content digital data is often subject to regulatory requirements for availability, confidentiality, integrity, and retention over a period of many years. As such, fixed-content data stores grow without bounds and storage of these digital assets over long periods of time presents significant logistical and economic challenges. In many applications, access to fixed-content data occurs in a multi-facility environment linked together over limited bandwidth wide area networks. In these environments, network, hardware, or software failures should not prevent access to the fixed-content data.

To address the economic and logistical challenges associated with storing an ever growing volume of information for long periods of time, fixed-content storage systems implement a multi-tier storage hierarchy and apply Information Lifecycle Management (ILM) policies that determine the number of copies of each object, the location of each object, and the storage tier for each object. These policies will vary based on the content of each object, age of each object, and the relevance of the object to the business processes.

A multi-site, multi-tier storage system, large scale distributed fixed-content storage is needed, for example, to address the requirement for storing multiple billions of fixed-content data objects. These systems ensure the integrity, availability, and authenticity of stored objects while ensuring the enforcement of Information Lifecycle Management and regulatory policies. Examples of regulatory policies include retention times and version control.

In general, large-scale distributed systems are comprised of components or nodes that may be inherently unreliable. Thus, as the distributed system grows in capacity and the geographic distribution of the nodes increases, the probability that all nodes are both reachable and operational decreases rapidly. The probability of all nodes being functional (e.g., reachable and operational) can be expressed by taking the probability that an individual node is functional and raising it to the power of the number of nodes. Thus, as the number of nodes increases, the probability that all nodes are functional becomes very small. When considering data integrity, it should be assumed that some nodes may be either non-operational or inaccessible.

SUMMARY

Providing redundant copies of fixed-content objects in a distributed system reduces the probability that a non-operational or inaccessible node will result in a loss of data. In order to maintain synchronization and consistency of fixed-content objects in a distributed system, two nodes should not make conflicting decisions concerning a managed object. The concept of a lock may be used to avoid conflicting decisions. The simplest locking algorithms rely on a centralized system to provide locks. More complex distributed lock management algorithms can operate without a centralized system, and deploy various techniques to ensure that only one node has any given lock at any given time. In other approaches, multiple lock management entities exist and these are fully synchronized. This approach is an extension of centralized lock management.

The situation when one or more nodes are operational but disconnected from the remainder of the distributed system is known as islanding. It is desirable for nodes to continue to provide service even in islanded environments. Therefore when using a locking system, the nodes should be able to acquire locks. However since the islanded nodes are not able to communicate with the centralized system, they can not determine that other nodes have not acquired the same lock.

To prevent conflicting locks, all access to objects could be placed on hold until the network is reconnected. Of course, this may result in all nodes in the system ceasing to operate in the presence of any islanding or node failure.

Alternatively, distributed systems that utilize locks could include a mechanism to permit multiple locks to exist, and to resolve the inconsistencies that result. These detection and resolution mechanisms are usually highly complex, and often cannot be automated. This results in such distributed systems being limited to applications where the data can be automatically reconciled.

The locking problem can be reduced to a local locking problem if a single node controls methods that alter the state of an object, while allowing other nodes to provide copies of the object without altering the state of the object. Using a single node to alter the state of an object avoids the undesirable characteristics of distributed locking, while still allowing access to the object even if communication between nodes is disrupted.

In one embodiment, a storage system receives a fixed-content object to be stored in accordance with information storage management policies. The fixed-content object is stored to a first storage component, and object management data associated with the fixed-content object is stored to a first object management component. An object management routine associated with the first management component is identified as being authorized to make changes to object management data associated with the fixed-content object. The fixed-content object may be stored or copied to other storage components. Similarly, the object management data associated with the fixed-content object may be stored to other object management components. The object management components identify that the object management routine associated with, e.g., the first object management component is authorized to make changes to the object management data associated with the fixed-content object. The object management components identify that the object management routines associated with other object management components are authorized to provide information related to the fixed-content object, but are not authorized to make changes to the object management data associated with the fixed-content object. After determining that the object management component that is authorized to make changes to the object management data is no longer accessible, other object management components may identify an object management routine associated with another object management component as being authorized to make changes to the object management data associated with the fixed-content object. If it is determined that the object management component that was originally authorized to make changes to the object management data is again accessible, the object management components are synchronized so that only one of the object management components is authorized to make changes to the object management data associated with the fixed-content object.

There may be a plurality of object management components that store object management data associated with a fixed-content object, and other object management components that do not store object management data associated with that fixed-content object. Some object management components may store object management data associated with a first plurality of fixed-content objects, and other object management component may store object management data associated with a second plurality of fixed-content objects, wherein a subset of the first plurality of fixed-content objects corresponds to a subset of the second plurality of fixed-content objects.

After identifying that an object management routine associated with an object management component is authorized to make changes to the object management data associated with the fixed-content object, the object management data identifying the authorized component may be propagated to other object management components.

An object management component may receive a request to make a change to the object management data associated with the fixed-content object. After determining which object management component is authorized to make the change, the request is forwarded to that object management component. If the request is unable to be forwarded, another object management component may be designated as the authorized component.

In another embodiment, a system maintains fixed-content objects. The system comprises a plurality of storage servers configured to store fixed-content objects, and a plurality of object management servers that that store object management data associated with a fixed-content object. The object management data may comprise identification of an object management server that is authorized to make changes to the object management data. If an object management server is unable to access the authorized object management server, another object management server may be designated as the authorized object management server. The designation of the new authorized object management server is then propagated to the other object management servers. If the original authorized object management server becomes accessible again, the object management servers are synchronized so that only one object management server is authorized to make changes to the object management data.

In another embodiment a fixed-content object is stored in a plurality of storage components, with the fixed-content object stored in one storage component being a copy of the fixed-content object stored in another component. Object management information is stored in a plurality of object management components. The object management information identifies an object management component as a primary object management component for the fixed-content object and other management components as secondary object management components for the fixed-content object. If the primary object component is no longer accessible by the second object management component, then the object management information stored at another object management component is modified to identify the object management component as the new primary object management component. The modified object management information may be propagated to other object management components.

After detecting that there are multiple primary object management components, the object management information stored at the object management components may be synchronized to identify a single object management component as the primary object management component. One example of detecting that multiple object management components are primary object management components may comprise transmitting a communication from one management component to another object management component and receiving in response a communication from the second object management component that identifies the second object management component as a primary object management component.

Attributes may comprise, for example, metadata information, an object location, object lifecycle management information. The lifecycle management information may comprise, for example, notification information, placement information, caching information, or retention time enforcement information.

In another embodiment, distributed storage system comprises a plurality of distributed storage nodes that store fixed-content objects, and a plurality of distributed storage management nodes in communication with the storage nodes over a network, the storage management nodes configured to maintain management information about the stored fixed-content objects. A storage management node may be configured to fulfill requests to change storage management information about a fixed-content object and other storage management nodes may be configured to forward requests to change storage management information about the fixed-content object to the first storage management node. The first storage management node may be configured to communicate the changed storage management information to other storage management nodes. A second storage management node may be configured to fulfill requests to change storage management information about the fixed-content object upon detecting that the first storage management node is unreachable. The second storage management node may be configured to direct future requests to change storage management information about the fixed-content object from other reachable storage management nodes to the second storage management node. The first storage management node may be configured to synchronize with the second storage management node upon detecting that the second storage management node is configured to receive requests from other storage management nodes.

DETAILED DESCRIPTION

Figure 1:
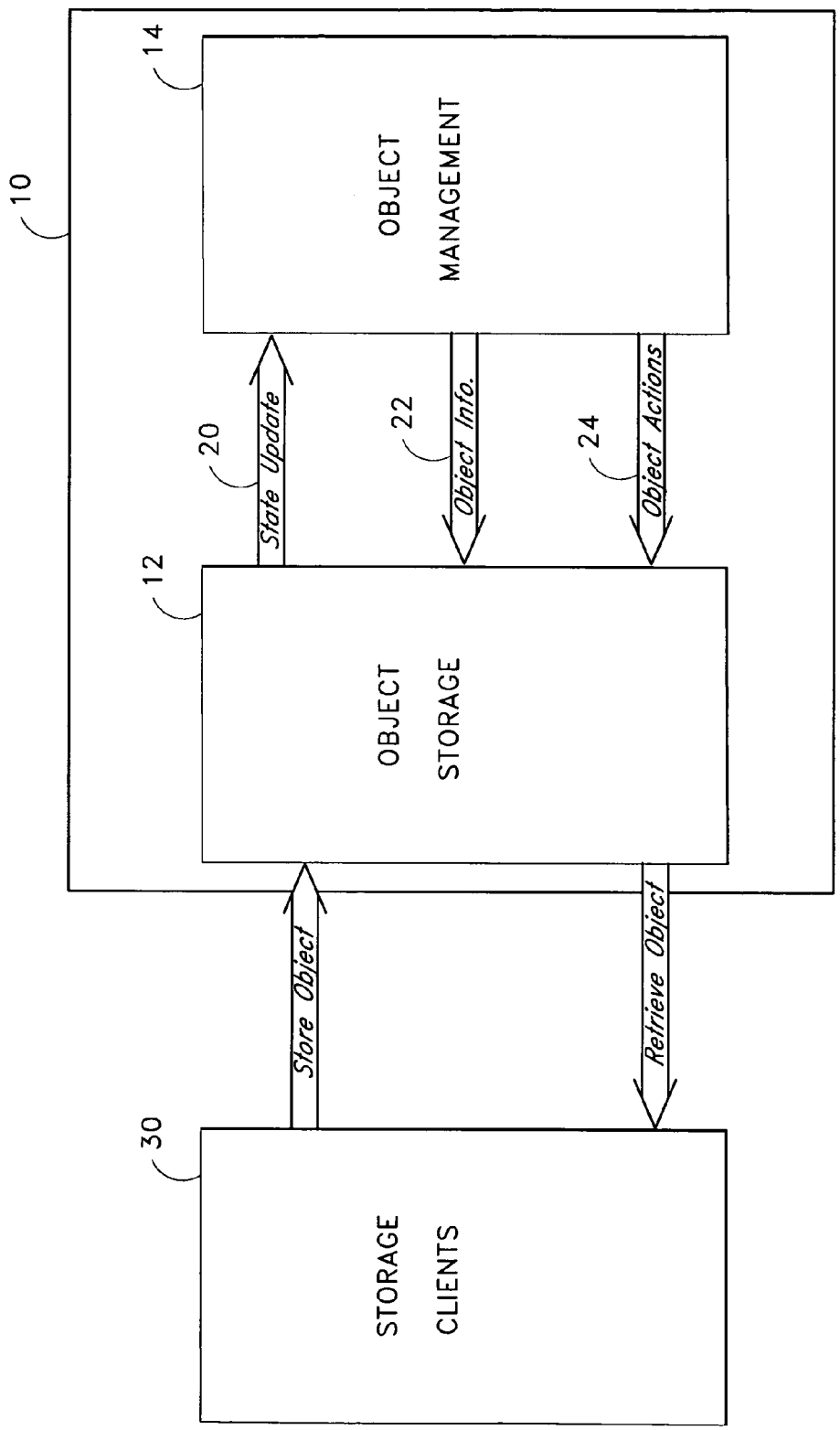
FIG. 1 illustrates a high level block diagram selected components of a distributed fixed-content storage system.

Continued adoption of digital technology in nearly all sectors including healthcare, media, government, and financial services is accelerating the creation of fixed-content data. Regulatory and business requirements for retention are resulting in the continued growth of data that must be stored and managed. In many sectors, the retention times exceed the practical lifetime of the storage media, and long term data archiving is an ongoing business challenge. As the archives grow, scaling limitations arise not only due to the size of the stored data but the number of fixed content objects that need to be stored and managed. This problem is exacerbated in regional deployments that have a large geographic footprint and operate over wide area networks which are subject to outages. There is a well defined and rapidly growing market demand for scalable fixed content storage systems that can span multiple sites, multiple storage tiers and multiple applications.

Fixed-content storage involves the storage and management of data such that once stored, the data is immutable—it cannot be changed. Thus, locks are not required for alterations to the contents of the object. However, despite the object itself being immutable, location(s) where an object is stored may change over time. Here the word "location" refers to both the geographic location as well as the storage tier on which an object is stored. Object storage locations vary with time as they are determined by the Information Lifecycle Management policies or regulatory policies.

Information Lifecycle Management policies may consider factors such as the cost of each storage media tier, the reliability of each storage media tier, the performance of each storage media tier, the accessibility of stored objects, and geographic consideration such as the location where objects were created, and where they are likely accessed For example, in the hypothetical scenario where cost of storage and bandwidth is small, accessibility and performance can be maximized by placing a copy of every object on every node. Conversely, in a model where the cost of storage and bandwidth is high, careful placement of objects allows maximized accessibility, reliability, and performance.

The computation of the optimal solution for object placement involves the execution of algorithms that utilize information about the object (object metadata), information about the state of the distributed system, and Information Lifecycle Management rules. Object metadata may be extracted from the content of the object, provided by an external application, or inferred at the time of input. In many applications object metadata is searchable.

Execution of the Information Lifecycle Management rules becomes highly computationally intensive as the number of objects increases and the rate of new object creation accelerates. In a simple probabilistic model, the computational workload increases linearly with the number of managed objects. This limits the scalability and performance of the fixed-content storage system.

To enable scalability to multiple petabytes and multiple billions of objects, the computational workload is distributed across multiple nodes within the distributed system. Each node is responsible for a number of objects, based on the computational resources per node and the computational resources required to manage the Information Lifecycle Management rules for each object.

However, once the computational workload is distributed, nodes need to make consistent decisions concerning the management of the storage locations of an object, even in scenarios where the distributed system is islanded or distributed locks do not exist.

A reliable fixed content storage system can scale to store large numbers of objects and span multiple facilities, multiple storage tiers, and multiple applications. Through the assignment of object ownership, performance and scalability limitations that are encountered in storing large numbers of fixed-content objects are addressed. In addition, the robustness of the system to network failures and islanded operations is greatly increased.

Previous approaches to provide scalable fixed-content storage systems have been based either on a traditional centralized architectures or a distributed and fully synchronized architecture. The former requires expensive computing and network resources and is not suitable for deployments that span a large geographic footprint. Distributed and fully synchronized architectures address some of the bandwidth, reliability, and footprint; however, these systems suffer from performance and scalability limitations as the number of objects grows and the geographic footprint expands.

Enabling the creation of large-scale distributed fixed-content storage systems allows for reduced deployment costs when compared to a centralized model, and higher reliability and availability when compared to an older style distributed system.

Assume a distributed system that provides multiple discrete compute resources nodes (N) arranged in a completely or partially known topology. If each compute resource has a known reliability then the expected service level can be calculated for any subset of N.

For a system of size N, calculations must be performed to determine the subset, M, of N that will be allocated to a given job. This calculation can take into account topology, workload, connectivity, availability, and reliability. Changes to any of these may trigger a recalculation of M.

Further assume any given job (J) is comprised of one or more executable methods and a shared state ($J_S$). The executable methods can further be divided into two categories: methods that alter the state of the job ($M_A$), and methods that do not alter the state of the job ($M_I$). Evaluation and enforcement of Information Lifecycle Management rules, such as moving an object from tape to disk, is an example of an instance of $M_A$. Object lookups and queries on the other hand do not alter the state of an object and are examples of $M_I$. Other examples of methods $M_A$ that alter the state of a job and require the participation of an owner include metadata storage, object location storage, object lifecycle management, and Information Lifecycle Management rule execution. Other examples of methods $M_I$ that do not alter the state on an object and can be performed without requiring the owner to be involved include metadata lookup, metadata query, object location lookup, and object location query.

When $J_S$ is synchronized across all nodes in M, any method belonging to $M_I$ can be invoked on any one of nodes within M without requiring resynchronization. Conversely, the invocation of any method belonging to $M_A$ will require resynchronization.

If more than one invocation to methods belonging to $M_A$ is permitted to be performed concurrently, the state of $J_S$ will not be consistent across nodes participating in M. Thus, either the invocation of methods belonging to $M_A$ must be surrounded by a protective distributed lock, or mechanisms must be provided by which to resolve differences in $J_S$ discovered during resynchronization.

If all invocations of $M_A$ are restricted to a single predetermined member of M, the locking problem can be reduced to a local locking problem which exhibits none of the undesirable characteristics of distributed locking. The member of M with the ability to invoke methods $M_A$ is henceforth referred to as the owner (O), and the remaining members of M are called "Replicas".

The selection of an owner requires a calculation that takes into account the same factors that are used to select M from N. As long as only one owner exists within M, ownership can be freely migrated within M by passing the ownership token between entities.

As a consequence, when the topology of M is split into two or more non-connected partitions, the owner will be present in only one of the partitions. The partition containing the owner will be able to invoke $M_A$ and $M_I$, where all other partitions will only be capable of invoking $M_I$. In the event where the compute resource that was the owner is known to be permanently lost, a new owner can be safely designated to restore full operation.

To address the inability to invoke methods belonging to $M_A$ during states where M is partitioned, additional mechanisms which resolve differences in $J_S$ as part of state synchronization must be utilized. Since only the owner initiates the synchronization of $J_S$ to other members of M, the owner participates in resolving any differences detected, and then resynchronizes the updated state. If $M_A$ must be invoked by a non-owner because the owner is unreachable for extended periods of time, a non-owner member of M can elect itself to become the "new owner." When connectivity is restored, the original owner will detect the other owner(s), and can proceed with the resolution of differences in $J_S$.

In one embodiment, a new owner synchronizes with other members of M that can not reach the original owner, and each member of M is then associated with one owner amongst members of M. These restrictions prevent synchronization inconsistencies.

It may occur that a plurality of non-owners attempt to become the new owner at the same time. The new owners will detect the other owner(s), and resolve any differences in a manner similar to when owners detect each other after connectivity is restored.

Within a fixed-content storage system there are a variety of tasks associated with a stored object. These include object verification, object metadata query, object metadata lookup, object location query, object location lookup, and Information Lifecycle Management rule enforcement. The latter includes replication, caching, retention time enforcement, and data movement within a storage hierarchy. These tasks, when distributed amongst a group of N nodes, represent a specific instance of the general problem.

In a distributed fixed-content storage system, each stored object is uniquely identifiable. Therefore, all tasks associated with each stored object can be considered an independent job J that needs to be distributed across N.

If object ownership is established at the time of object creation and all tasks that alter the "storage state" of an object are assigned to the owner, it is possible to create a system that does not exhibit the scales to address large numbers of objects without the scaling limitations outlined before. The calculation to determine M and to select an owner can be based, for example, on topology, state of the system, and the Information Lifecycle Management rules associated with the content.

In a distributed fixed-content storage system spanning multiple sites and multiple tiers of storage, object management tasks that change the state of an immutable fixed-content object represent a significant computing load that limits the scalability and performance of the storage system for large numbers of objects. System reliability challenges are encountered if wide area network connections linking the different sites are subject to disruptions. To address these limitations, object management tasks that cause state changes must be distributed amongst a number of computing resources without requiring global synchronization or locking.

FIG. 1 illustrates a high level block diagram showing selected components of a distributed fixed-content storage system 10. The scalability, reliability, and performance problems associated with managing large numbers of fixed-content objects in a multi-site, multi-tier, fixed-content storage system are addressed through the use of object ownership. One or more clients 30 may access the storage system 10, for example, to place objects into storage or to retrieve previously stored objects.

The Object Storage Subsystem (OSS) 12 is responsible for object storage, object protection, object verification, object compression, object encryption, object transfer between nodes, interactions with client applications, and object caching. For example, any type of fixed content, such as diagnostic images, lab results, doctor notes, or audio and video files, may be stored as objects in the Object Storage Subsystem. The object may be stored using file-access protocols such as CIFS (Common Internet File System), NFS (Network File System) or DICOM (Digital Imaging and Communications in Medicine). There may be multiple Object Storage Subsystems in a given topology, with each Object Storage Subsystem maintaining a subset of objects. Redundant copies of an object may be stored in multiple locations and on various types of storage media, such as optical drives, hard drives, magnetic tape or flash memory.

The Object Management Subsystem (OMS) 14 is responsible for managing the state of objects within the system. The Object Management Subsystem 14 stores information about the state of the objects and manages object ownership within in the distributed fixed-content storage system.

State updates 20 can be triggered by client operations or by changes to the storage infrastructure that is managed by the Object Storage Subsystem 12. Object alteration actions 24 are generated by the Object Management Subsystem 14 in response to state updates 20. Examples of object alteration actions 24 include, for example, metadata storage, object location storage, object lifecycle management, and Information Lifecycle Management rule execution. Processing of state updates 20 and the resulting object alteration actions 24 can be distributed among a network of computing resources. The Object Management Subsystem may also perform object information actions 22 that do not alter the state on an object and may include metadata lookup, metadata query, object location lookup, and object location query.

Figure 2:
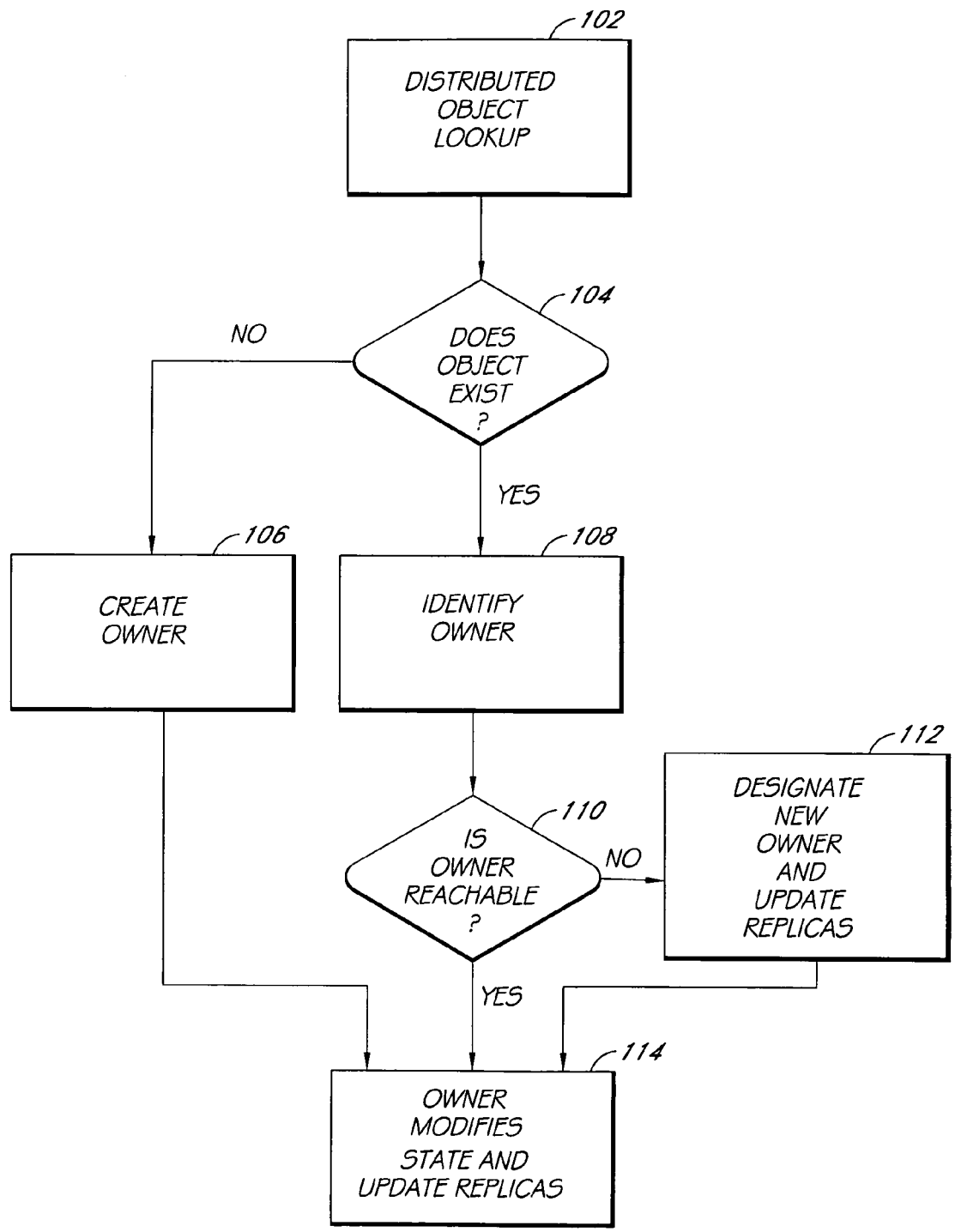
FIG. 2 illustrates the flow of processes for state changes and actions in a distributed fixed content storage system that utilizes object ownership.

FIG. 2 illustrates the flow of processes for state changes and actions in a distributed fixed content storage system 10 that utilizes object ownership. When the Object Management Subsystem 14 receives an update to the state of an object (for example, object creation or deletion), a distributed lookup is used at step 102 to determine if the specified object exists.

If the object is not found at step 104, a new owner is created, the state is set, and the Information Lifecycle Management rules are evaluated at step 106.

If the object is found at step 104, the owner is identified at step 108. If the owner is not reachable at step 110, one of the replicas is designated as the new owner at step 112. The designation of the new owner needs to be propagated throughout the distributed system. Accordingly, the new owner provides updates to the remaining replicas, assuming they are reachable. The owner then modifies the state at step 114, and the Information Lifecycle Management rules are evaluated.

If the owner is reachable at step 110, the state is modified, and the Information Lifecycle Management rules are evaluated.

Associated with each state modification, known reachable replicas are updated. Changes may result in the creation of new replicas, the destruction of existing replicas, or the migration of ownership to another replica.

When Information Lifecycle Management rules are evaluated, there are two possible outcomes. Actions may be triggered to try to cause the storage system to change where content is stored, and/or timed events may be stored. Timed events will re-emerge after a designated time, and the Information Lifecycle Management rules evaluation will be performed again at that point.

When actions are triggered, they are managed separately to deal with latencies and unavailability associated with the object storage infrastructure.

Communication between nodes in a distributed system may at some point fail. For example, a network failure may prevent a first group of nodes from communicating with a second group of nodes. A failure in communication between a node or group of nodes is referred to as islanding.

Figure 3:
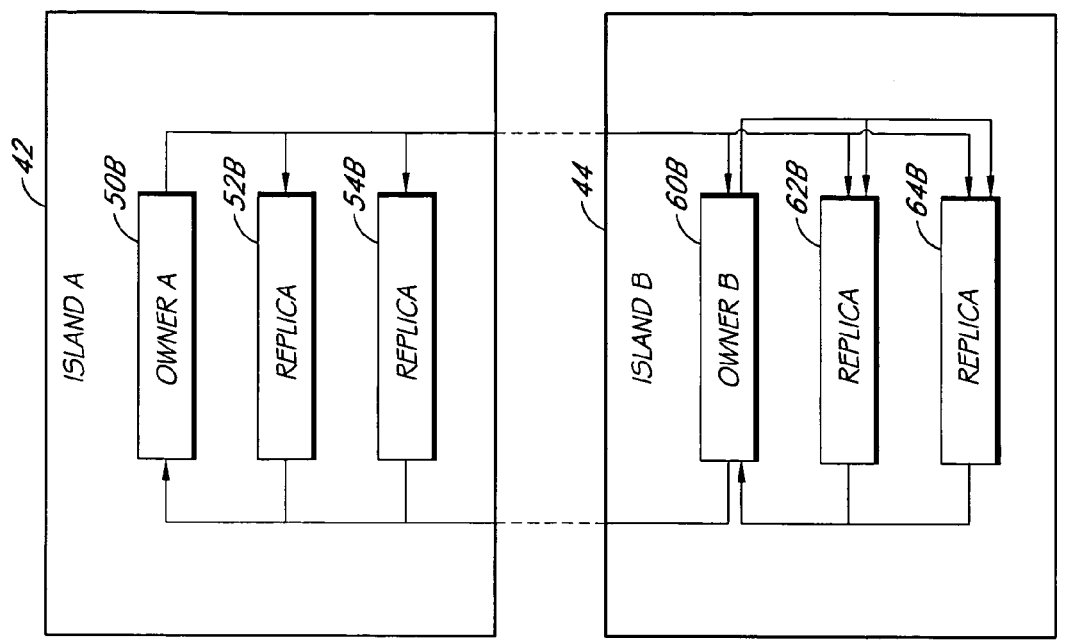
FIG. 3 illustrates an example of islanding and reconnection in a grid.
Figure 3:
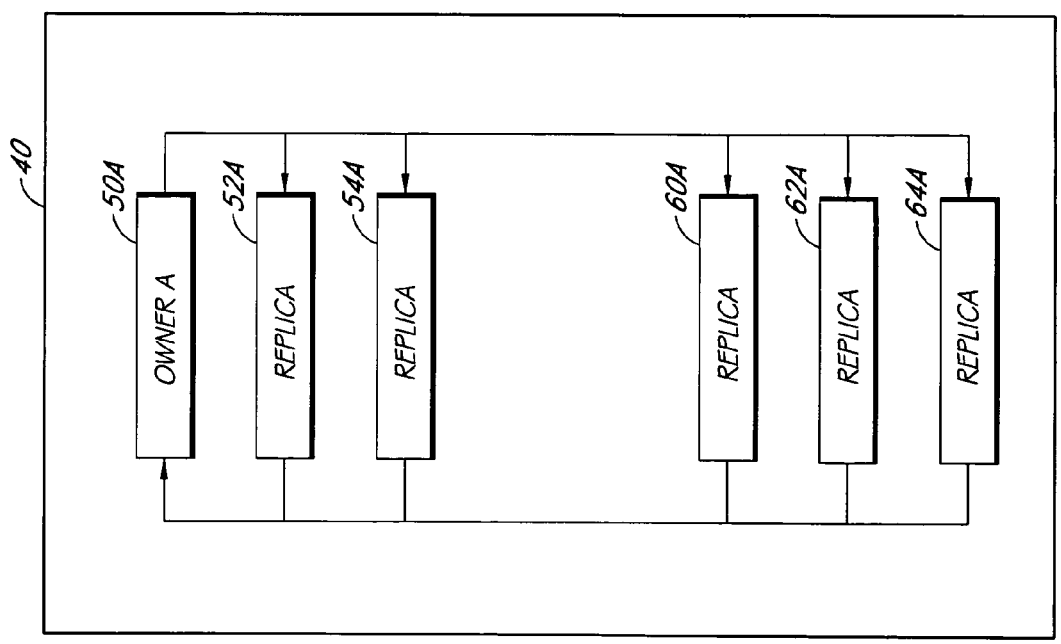

FIG. 3 illustrates an example of islanding in a grid 40. In this example, an owner 50A of the object state contains a list of replicas 52A, 54A, 60A, 62A and 64A. A change in the state of the owner 50A causes synchronization of the updated state to each of the replicas via a list of all replicas in the system. In turn, each replica has a back-reference to the owner, allowing the rapid location of the owner 50A during the distributed object lookup.

The topology of the grid 40 is changed such that it is split into two isolated islands 42 and 44. There are two possible outcomes: one island contains the owner and all replicas; or one island contains the owner and possibly one or more replicas, and the other island contains one or more replicas only.

In the second case, where only replicas exist within the island, a request requiring modification to the object state will trigger one of the islanded replicas to be changed into a new owner 60B (as the attempt to communicate to the original owner via the back-reference fails). This new owner 60B then discovers and builds a list of all reachable replicas 62B and 64B within the island, and "captures" them (where the original owner as indicated by the back-reference is no longer reachable). For each captured replica, the back-reference is updated to refer to the new owner 60B. This allows partial connectivity scenarios to be safely handled. The original owner 50B still retains references to all of the replicas, including the new owner 60B.

When the islanding is repaired, the results of the islanding are then discovered. For example, the original owner 50B may try to contact the new owner 60B or one of its captured replicas via its list of replicas, or new owner 60B may initiate reconsolidation using the back-reference to the original owner 50B.

For the first scenario, once the original owner has discovered the new owner, and all of the captured replicas are also reachable to the original owner, the state of the two owners is reconciled and all of the replicas are re-captured by the original owner. As part of this process, the second owner is converted back to a replica.

For the second scenario, a list would be kept of all objects where a new owner has been designated due to connectivity issues. When a notification of topology change is received, this list can then be processed to reduce the duration where multiple owners exist. When the second owner contacts the first owner, the first owner would handle reconsolidation in the same manner as described in the first scenario.

While additional replicas may be created by the second owner during the period when it was islanded, these additional replicas will be discovered by the original owner as part of the reconsolidation process. If multiple islanding events have occurred, this process may be repeated multiple times.

In one embodiment, a distributed fixed-content storage system consists of multiple independent computing and storage resources connected together over wide area networks of varying bandwidth. Each computing resource within this distributed system hosts an operating system along with specific application services.

Each computing resource within the distributed fixed-content storage system constitutes a node of a distributed computing network and the type of services that run on each node determine the functions performed by that node. The distributed fixed-content storage system may have properties such as coordinating computing and storage resources without a central point of control, redundancy in that failure of any individual component does not impact the operation of the system, and a series of standardized protocols to store and retrieve fixed-content objects using external applications.

In one embodiment, a subset of nodes in the storage system run a service called the Storage Node Service which provides for the storage, protection, lossless compression, encryption, verification, caching, and transmission of fixed-content objects between nodes and to client applications. Storage nodes may utilize a computing resource and a finite amount of a non-volatile storage that is assigned to the computing resource. The storage media may use a variety of formats, such as magnetic disk drive storage, optical disc storage, magnetic tape storage, flash memory storage, or any other type of non-volatile storage. The storage may, for example, be spinning or removable media that is attached to the computing resource either directly or via the network.

A subset of nodes in the storage system run a service called the Content Metadata Service (CMS) that provides for object metadata storage, object metadata replication, object metadata synchronization, object metadata query, object location lookup, and object location query. These nodes are designated as control nodes. In addition, to metadata management the control nodes embody and enforce the Information Lifecycle Management business rules that govern the lifecycle of a fixed-content object within the storage system. Each control node utilizes a computing resource with a finite amount of non-volatile storage media. The storage may be internal to the computing resource or externally attached either directly or via the network. To store and perform queries on object metadata, the Content Metadata Service may utilize a relational database which may be hosted on the same computing resource.

Within the storage system, a subset of nodes designated as gateway nodes provide for protocol processing. The gateway nodes enable external applications to store and retrieve fixed-content objects from the storage system.

Within the storage system, object ownership is assigned and managed by the Content Metadata Service of the control node. When a new object is stored by an external application, a gateway node submits the object to a storage node so that it can be committed as a managed object within the storage system. As part of committing the stored object, messages are sent from the storage node service to a Content Metadata Service to indicate the creation of a new object that needs to be managed.

When a new object to be managed is signaled to a Content Metadata Service, that Content Metadata Service creates a new owner for that object. This owner exists as a series of tables in a relational database to that specific Content Metadata Service instance. These database tables also contain metadata associated with the object, along with other state information, including the location where the object was originally stored.

Based on the metadata, the owner evaluates the Information Lifecycle Management rules designated for the object using an event-driven state machine. These Information Lifecycle Management rules result in additional locations for the object being created, and may result in the removal of the original location for the object. In order to ensure redundancy, additional copies of object metadata must be created. The number of metadata copies and the location of these copies may be determined by the Information Lifecycle Management business rules. Selection of the appropriate control nodes for storing the metadata copies involves a calculation that is based on available control nodes, available computing resources, connectivity state of the storage system and the storage system topology. This is equivalent to selecting M from N. Although the object ownership information and object metadata information is replicated to the selected control nodes, the original control node may remain the owner of the object until such time that it is deemed to be inoperable or removed from service. At such time object ownership is passed to one of the other control nodes that manage the metadata for that object. The result is a fully operational storage system rapidly reaching a steady-state equilibrium based on the configured Information Lifecycle Management rules.

If there is a computing or network connectivity failure, and the owner is unreachable, when an event that modifies the state of the object occurs (notification of the temporary or permanent loss of a storage location, a request to delete an object, changes to Information Lifecycle Management rules, and so on), a new owner is designated. When the connectivity failure is resolved or the failed computing resource is restored, the presence of two owners is detected and the conflicts are resolved.

Figure 4:
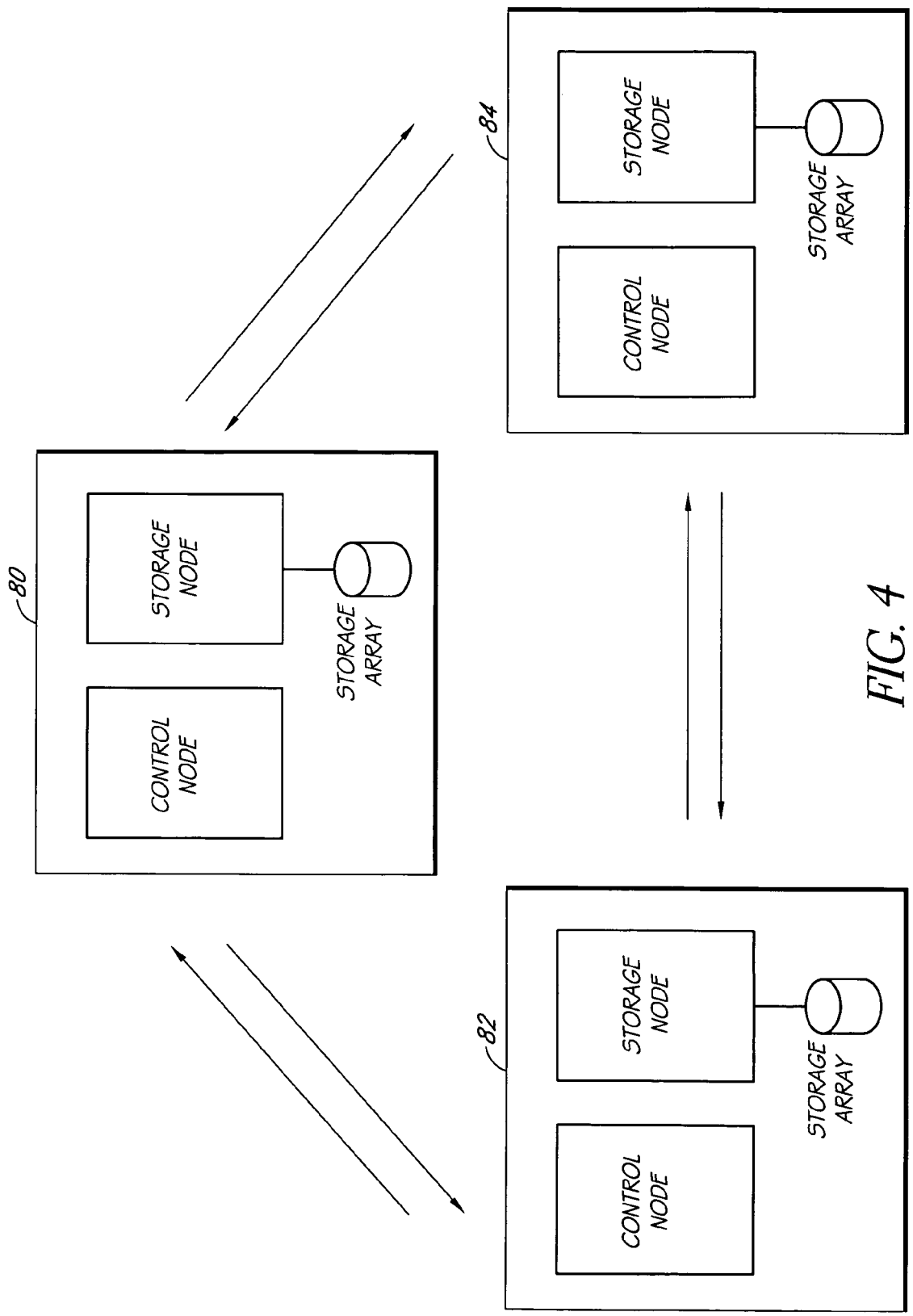
FIG. 4 illustrates a particular example of geographically distributed multi-site organization.

FIG. 4 illustrates a particular example of geographically distributed multi-site organization having sites 80, 82 and 84. These sites are connected with a Wide-Area Network comprised of, for example, T1 and T3 network connections and IP routers allowing TCP/IP connectivity from any site to any other site. The Information Lifecycle Management rules are configured such that data input into the system at site 80 is initially replicated to site 82. The data may be propagated to other sites, such as site 84, at periodic intervals. For example, the data may be replicated to site 84 one month from the time of first ingest.

At each site, there are two identically configured servers each consisting of an Intel x86 3 GHz processor with 2 GB of RAM and 4×300 GB internal disks. The first server is designated as the "Control Node" and runs an instance of MySQL database and the Content Metadata Service. This server manages the stored objects. The second server is designated as the "Storage Node" and runs the "LDR" (Local Distribution Router) service. The Storage Node is connected to an external 10 TB RAID-5 Fiber Channel attached storage array. In this example, all three sites have identical hardware and software. The Storage Grid formed by these three sites is used by a record management application for the storage of digital documents. The record management system interfaces with the storage grid using HTTP.

The record management application opens an HTTP connection to the Storage Node in Site 80 and performs an HTTP PUT operation to store a digitized document. At this point a new object is created in the Storage Grid. The object is protected and stored on the external storage of the Storage Node by the Local Distribution Router service. Metadata about the newly stored document is sent to the Content Metadata Service on the Control Node, which creates a new entry for the object. This Content Metadata Service becomes the "Owner" for this object. According to rules specifying the degree of replication of the metadata information, an additional copy of the metadata is created in Site 82.

An instance of the records management system at site 82 requests to read the document by performing an HTTP GET transaction to the storage node in Site 82. At this point the Local Distribution Router service on that Storage Node requests metadata information about the object from the Control Node in Site 82. In this case, the metadata is read directly from Site 82 (a read operation), and the owning Content Metadata Service at Site 80 is not involved.

After one month has elapsed, Information Lifecycle Rules dictate that a copy of the object is required in Site 84. The Owner Content Metadata Service at Site 80 initiates this action. Once this additional copy is made, the updated metadata indicating the presence of the new copy is sent to the Content Metadata Service in Site 84. When this metadata is received, the owner for the object must be involved, as the metadata is being modified. The message containing the modification request is forwarded to the owner (the Content Metadata Service in Site 80) based on the information contained in the metadata for the object.

If Site 84 was not able to communicate with Site 80, the Content Metadata Service in Site 84 detects this lack of connectivity while trying to forward the modification request over the network connection between the two Content Metadata Services. This triggers it to change the locally stored object metadata such that it now owns the object, then update the metadata. When Site 80 becomes available again, the Content Metadata Service in Site 80 or in Site 84 would detect that there are two owners and trigger the process to reconcile ownership such that there is only a single owner.

The combination of these steady state and failure condition behaviors permit continued and provable correct operation in all cases where sufficient resources are available, and require the minimal expenditure of computing resources. The property that the computing resources required to manage objects grows linearly with the number of objects allows the system to scale to handle extremely large numbers of objects, thus fulfilling the business objectives of providing large scale distributed storage systems.

Figure 5:
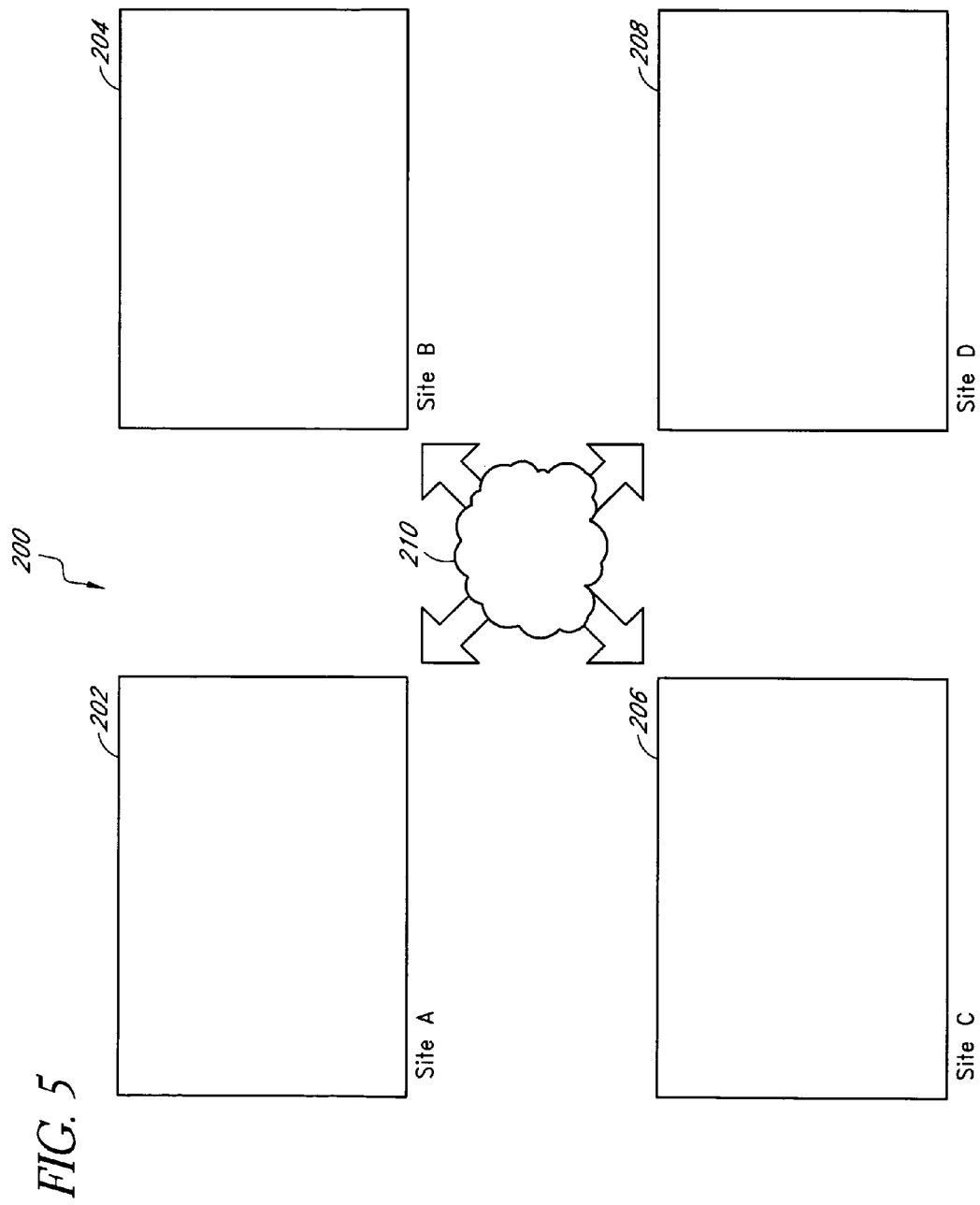
FIG. 5 illustrates communication between grid sites.

An exemplary embodiment follows, where the object management is implemented in a Storage Grid composed of nodes. As illustrated in FIG. 5, a Storage Grid 200 may be distributed over various locations, such as Site A 202, Site B 204, Site C 206, and site D 208.

Nodes within a site may communicate with other nodes in the same or other sites by using one or more networks 210. A node may be, e.g., one or more software components (or services) running on a computer. The services may communicate using messaging protocols. The communications may occur between services running on a common server or between multiple servers connected by a network. Communications may occur using a secure tunnel if needed. Islanding may occur, for example, when a site is unable to communicate with other sites, or when a node is unable to communicate with other nodes.

Figure 6:
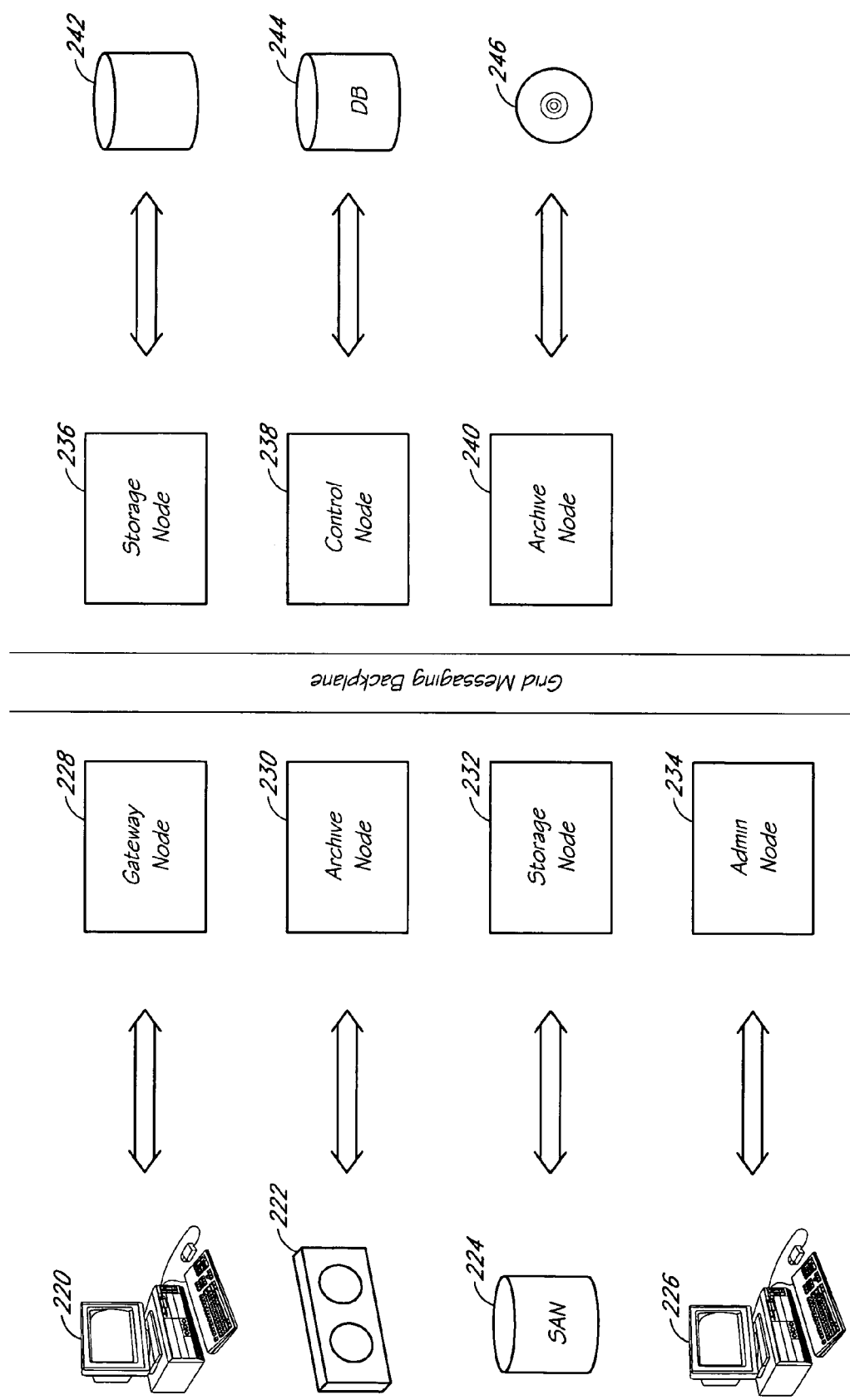
FIG. 6 illustrates example nodes in a grid system.

FIG. 6 illustrates some of the nodes that may be found in a Storage Grid 200. At a high level, the Storage Grid 200 provides storage services to external applications, and utilizes storage services provided by external storage infrastructure. The Storage Grid 200 also provides management services to allow for operational management, monitoring and configuration.

An external application 220 may interface with the Storage Grid 200 to store and retrieve data. The Storage Grid 200 may utilize external storage resources, such as a managed tape library 222 or an enterprise SAN 224. A management interface 226 may also allow the operational status of the grid and associated services to be monitored and managed.

Nodes may be grouped based on the services they provide. For example, storage nodes 232, 236 may provide for secure data storage and transmission. A storage node may consist of a service running on a computing resource that manages storage and archival media such as a spinning media resource or tape.

The storage resource 224, 242 on a storage node can be based on any storage technology, such as RAID, NAS, SAN, or JBOD. Furthermore, this resource may be based on any grade of disk such as a high performance fiber channel or ATA disk. Storage nodes and may be linked together over, for example, LAN and WAN network links of differing bandwidth.

Storage nodes can accept data and process retrieval requests, and information input into a storage node can be retrieved from other storage nodes. Storage nodes may process client protocol requests and include support for DICOM, HTTP and RTP/RTSP. Support for NFS/CIFS may be provided, for example, through gateway nodes.

Storage nodes may replicate and cache data across multiple sites and multiple nodes. Data replication is based on a set of configurable rules that are applied to the object metadata and may take into account geographic separation of nodes as well as the bandwidth between nodes. The logic that governs replication and distribution may be enforced by control nodes.

Gateway nodes 228 provide an interface through which external applications may communicate with the storage grid. They route incoming requests to storage nodes based on, for example, the available CPU, bandwidth, storage and geographic proximately. For applications that require direct file system access, the gateway nodes may provide a NFS/CIFS interface to the storage grid.

Control nodes 238 may consist of separate software services, such as the Content Metadata Service (CMS) and the Administrative Domain Controller (ADC). Although these services can run on separate computing resources, they may also share a single server. The Content Metadata Service constitutes a distributed business rules engine that provides for content metadata storage, metadata synchronization, metadata query and enforcement of replication and information lifecycle management business logic. Replication and information lifecycle management policies may be based on metadata that is associated with stored objects. This allows the creation of business rules that determine where content is stored, how many copies are stored, and on what media it is stored on throughout its lifecycle. A Content Metadata Service may interface, for example, with a local SQL database through a database abstraction layer.

The Administrative Domain Controller acts as a trusted authentication repository for node-to-node communication. It also provides knowledge of system topology and information to optimize real-time usage of bandwidth, CPU and storage resources. This allows automated management of computational resources and dynamic load balancing of requests based on the available CPU, storage and bandwidth resources.

The Administration Node 234 may consist of software components such as the Network Management Service and the Audit Service. These services may share a common computing resource, or they may be run on separate computing resources.

The Audit Service provides for the secure and reliable delivery and storage of audited events corresponding to content transactions across the entire Storage Grid. Audit events are generated, in real-time, by Storage Nodes and Control Nodes. Events are then relayed through the Storage Grid using a reliable transport mechanism and delivered to the Administration Nodes. Audit messages are processed by the Audit Service and may be directed to an external database or file.

The Network Management Service collects and processes real-time metrics on utilization of computing, storage and bandwidth resources. It provides real-time and historical usage reports. In addition it is responsible for fault reporting and configuration management.

The Archive Node 230, 240 may manage a locally attached tape drive or library 246 for the archiving and retrieval of grid managed objects. Archive nodes may be added to diversify archive pools and to provide archival storage at multiple sites.

A typical deployment may involve multiple nodes, often spanning multiple geographically separated sites. When a request for information is made, the Storage Grid may serve that request based on the location of the data, the location of the user, the load on the system, and the state of the network. This balances the load on the network, storage and servers in order to minimize bandwidth usage and increase performance. The Storage Grid is a unified structure, but there may not be a single server or repository of content or metadata.

Storage Nodes and Control Nodes in the Storage Grid can be upgraded, decommissioned, replaced or temporarily disconnected without any disruption. Nodes do not need to run on the same hardware or have the same storage capacity. Nodes replicate and cache data across multiple sites and multiple nodes. In addition to bandwidth savings, the intelligent distribution of information provides for real-time backup, automated disaster recovery and increased reliability.

Capacity, performance and geographic footprint of the Storage Grid can be increased by adding nodes as needed, when needed, without impacting end-users. This enables the Storage Grid to accommodate thousands of terabytes of data across hundreds of locations. The Storage Grid combines the power of multiple computers to achieve extremely high levels of scalability and throughput. As nodes are added to the Storage Grid, they contribute to the available computational and storage resources. These resources are seamlessly utilized based on bandwidth availability and geographical suitability.

In traditional archives, information is stored as files, and access to data is gained through a path pointer stored in an external database. When storage scales, old storage is replaced, or is offline, this results in broken pointers and unavailable data. In order to scale, costly and disruptive migration procedures are required. Furthermore, it is difficult to operate in heterogeneous environments and multi-site deployments. This is because the approach relies on the underlying file system and network file system protocols.

Within the Storage Grid, data are stored and referenced as objects. An object can be one file or a collection of files with relationships that are defined by object metadata. Object metadata constitutes application specific information that is associated with a data object. This information can be attached to or extracted from the object at the time of input into the Storage Grid. Object metadata can be queried and the Storage Grid can enforce business rules based on this information. This allows for efficient utilization of storage/bandwidth resources, and enforcement of storage management policies.

In this object oriented architecture, external applications no longer use pointers to a path, but a universal handle to an object. This enables high levels of reliability, scalability and efficient data management without the need for disruptive migration processes. Multiple object classes can be defined and for each object class, there are specific business rules that determine the storage management strategy.

In this embodiment, the Storage Grid is fault tolerant, resilient and self-healing. Transactions continue to be processed even after multiple hardware, storage and network failures. The design philosophy is that hardware, network, and catastrophic failures will occur, and the system should be able to deal with faults in an automated manner without impacting the stored data or end-users.

Reliability is achieved through replicas, which are identical copies of objects (both data and metadata) that are stored on multiple nodes and kept synchronized. Increasing reliability involves adding nodes to the Storage Grid and increasing the number of replicas for each object. The location and number of the replicas is based on a set of rules that can be configured to ensure geographical separation and the desired level of redundancy. The Storage Grid will automatically enforce this logic across all nodes. If a failure is detected, the system is self-healing in that additional replicas are automatically created to restore the level of resiliency.

As nodes are added, removed or replaced, the system manages the available storage. Incoming data is transparently re-directed to the take advantage of the newly added storage capacity. Within the Storage Grid objects are redistributed, purged, or replicated based on metadata and policies that are applied to the metadata. Objects can also migrate from one storage grade (e.g., disk) to another (e.g., tape) not simply based on time and date stamps, but external metadata that indicates the importance of the object to the specific business application. For example in medical applications, certain imaging exams may be immediately committed to deep storage. In applications for the financial sector, retention policies may be set up to facilitate compliance with regulatory requirements for data retention.

Users may input and retrieve data from the location within the Storage Grid that is closest to them, thereby efficiently utilizing bandwidth and reducing latency. In addition, as information is requested, it may be cached at the requesting Storage Node to enable improved bandwidth efficiency.

Obsolete components can be removed without impacting services or endangering stability and reliability. A Storage Node may be decommissioned through the administrative console. When this takes place, the Storage Grid may automatically redirect requests to alternate nodes. Furthermore, the Storage Grid may transparently re-distribute the stored data on other suitable Storage Nodes. This allows for seamless removal of obsolete hardware without any disruptions to Storage Grid operations. This is in contrast to disruptive data migration procedures that are common in many fixed content applications. Operators can eliminate support for obsolete hardware while taking advantage of the economic benefits of decreasing costs of storage and increases in processing power. Each newly added node costs less and provides more processing power and storage capacity.

When data and metadata are stored into the Storage Grid, the data and metadata is packaged into an object. Objects consist of data and associated metadata that are managed as an unalterable and atomic entity. Once stored, these objects are actively managed throughout their information lifecycle. When an object is retrieved, the original data and associated metadata is presented for use. This provides a transparent storage service to external entities.

Each object may have a unique identifier that acts as the primary identifier for the object. This identifier may be assigned at the time the object is created. Objects can be moved from one object store to another.

Objects stored within the grid may contain metadata, which is used to manage the objects over their lifecycle and facilitate access to the objects. Object metadata may include, for example, Content Block metadata, Protocol metadata, Content metadata, User metadata, or Management metadata.

Content Block metadata may be metadata associated with the object creation process itself, and provides information about the packaging and protection of the user provided data and metadata. An example of this type of metadata is the size of the data stored in a given object.

Protocol metadata may be metadata associated with the protocol used to store the object, but not intrinsic to the data within the object. This includes metadata required to perform protocol specific transactions. For data stored through the DICOM protocol, an example of this type of metadata is the DICOM AE title of the entity that stored the data.

Content metadata may include metadata contained within recognized types of content. If so processed, metadata specific to each recognized type of content is extracted from the content. For content of type PDF, an example of this type of metadata is the number of pages in a document.

User metadata may include arbitrary metadata specified by the entity storing content into the grid. This ability to attach user metadata is limited by the protocol used to store the objects. An example of this type of metadata is a private identifier assigned by the user.

Management metadata consists of metadata generated and modified over time as objects are managed within the grid. Unlike the previous four classes of metadata, this metadata is not immutable, and is not present as part of the object itself. An example of this type of metadata is the time when an object was last accessed.

Each time a new object is stored, the metadata associated with the object is also stored in a separate subsystem that maintains a repository of metadata. The metadata store can be queried to return the metadata associated with a given object. Queries can also be performed to return a list of objects and requested metadata for all objects that have metadata that matches a specific query.

By mapping relationships between metadata, composite objects can be created. Metadata queries can be constructed to return multiple objects that share a given a value for one or more pieces of metadata.

For example, with the DICOM protocol, the study ID associated with each instance is part of the content metadata. All instances with a given study identifier are considered to belong to the same study, and by considering objects with a given study identifier as belonging to a larger, composite "Study" object, all of the objects comprising a study can be managed and accessed as a group.

Because composite objects are defined as relationships between object metadata according to a defined schema, they are virtual and do not exist as actual stored objects. When a schema for a composite object has been defined, queries and rules can then refer to these objects directly for management and query purposes.

Placement of objects may be based on the capabilities of the storage grid computing resources. Different computing resources have different capacity to perform work. While this is primarily measured based on the clock frequency of the processor, the number of processors and relative efficiencies of different processor families may also be taken into account. In addition, the amount of CPU resources that are currently in use provides a mechanism to determine how "busy" a given resource is. These characteristics are monitored and measured to allow decisions to be made within the grid about which computing resource is best suited to use to perform a given task.

Placement of objects may also be based on the characteristics of the storage resources, such as storage latency, reliability, and cost. Storage capacity provides information for calculating risk in the event of rebuild. A measurement of the amount of storage capacity that is currently in use provides a mechanism to determine how full a given storage resource is, and determine which locations are more able to handle the storage or migration of new content. Different storage resources have different throughput. For example, high performance Fiber-Channel RAID systems will deliver better performance then a lower performance software RAID on IDE drives. A measurement of the amount of I/O bandwidth that is currently in use provides a mechanism to determine the extent to which a given storage resource is able to handle additional transactions, and how much it will slow down current transactions. Storage resources can be read-only, and thus not a candidate for the storage of new objects. These characteristics may be monitored and measured to allow decisions to be made within the grid about which storage resource is best suited to use to retain objects over time, and influence the rules that determine where objects should be stored.

Placement of objects may also consider the characteristics of network paths, such as latency, reliability and cost. Different network paths have different amounts of bandwidth available. This directly maps into the time required to transfer objects from one storage repository to another. The amount of the network bandwidth that is currently in use may also be considered. This provides a mechanism to determine how "busy" a given network link is, and to compare the expected performance as compared to the theoretical performance. These characteristics may be monitored and measured to allow decisions to be made within the grid about which network path is best suited to use to transfer objects through the grid.

When objects are stored in multiple different locations, the probability of data loss is reduced. By taking common-mode failure relationships and fault probability information into account, the probability of data loss and data inaccessibility for a given placement of objects can be quantified and reduced to manageable levels based on the value of the data in question.

To avoid common mode failures, replicas of objects can be placed in separate failure zones. For examples, two replicas created within a single server room can take into account that storage on nodes that do not share a single UPS have a higher probability of accessibility then two replicas stored on two nodes that share the same UPS. On a larger scale, two replicas created in geographically distant locations have a lower probability of loss then two nodes within the same facility.

As replica placement rules are metadata driven, they can be influenced by external systems and can change over time. Changes to existing replicas and changes to the topology of the grid can also influence replica placement rules.

Replica placement can reflect the instantaneous, historical and predictive information associated with a given resource. For example, monitoring of server and storage health can dynamically influence the degree of reliability attributed to a given resource. Different types of storage resources, such as IDE vs. SCSI, have different reliability characteristics. In addition, archival and offline storage often have a distinct media lifetime, which need to be managed to preserve archive integrity. These are both examples of the use of information about available resources is used to determine the best solution for a given set of constraints.

Implementation of configuration information based on formal risk analysis can further optimize the resource tradeoff by providing information about common mode failures that cannot be automatically discovered by the grid. For example, the placement of two replicas on nodes situated along the same fault line may be considered to be within a common failure mode, and thus suboptimal when compared to the placement of one of the replica in a facility not located on the fault.

The use of external data feeds can provide valuable information about changes in the reliability of a given failure zone. In one scenario, a live feed from the weather monitoring system can provide advance notice of extreme weather events, which could allow the grid to dynamically rebalance content to reduce the risks associated with the loss of connectivity to a given facility.

The high-level overview illustrated in the figures partitions the functionality of the overall system into modules for ease of explanation. It is to be understood, however, that one or more modules may operate as a single unit. Conversely, a single module may comprise one or more subcomponents that are distributed throughout one or more locations. Further, the communication between the modules may occur in a variety of ways, such as hardware implementations, software implementation, or a combination of hardware and software. Further, the modules may be realized using state machines, microcode, microprocessors, digital signal processors, or any other appropriate digital or analog technology.

It should be understood that the methods and systems described herein may be implemented in a variety of ways. Other embodiments that are apparent to those of ordinary skill in the art, including embodiments which do not provide all of the benefits and features set forth herein, are also within the scope of the invention. While some of the embodiments described herein provide specific details for implementation, the scope of the disclosure is intended to be broad and not limited to the specific embodiments described. Accordingly, details described in the specification should not be construed as limitations of the claimed invention. Rather, the scope of the claims should be ascertained from the language of the claims, which use terms consistent with their plain and ordinary meaning.

What is claimed is:

1. A method of maintaining fixed-content objects in a storage system, comprising:

receiving a fixed-content object to be stored in accordance with information storage management policies;

storing the fixed-content object to a first storage component;

storing object management data associated with the fixed-content object to a first object management component;

identifying at the first object management component that an object management routine associated with the first management component is authorized to make changes to object management data associated with the fixed-content object;

storing the fixed-content object to at least a second storage component;

storing the object management data associated with the fixed-content object to at least a second object management component;

identifying at the second object management component that the object management routine associated with the first object management component is authorized to make changes to the object management data associated with the fixed-content object;

identifying at the second object management component that the object management routine associated with the second object management component is authorized to provide information related to the fixed-content object, but is not authorized to make changes to the object management data associated with the fixed-content object;

identifying at the first object management component that the object management routine associated with the second object management component is authorized to provide information related to the fixed-content object, but is not authorized to make changes to the object management data associated with the fixed-content object;

after detecting a failure in communication between the first object management component and the second object management component, identifying at the second object management component that an object management routine associated with the second object management component is authorized to make changes to the object management data associated with the fixed-content object; and after detecting restoration of communication between the first object management component and the second object management component, synchronizing the first object management component and the second object management component so that only one of the object management components is authorized to make changes to the object management data associated with the fixed-content object.

2. The method of claim 1, wherein the first object management component stores object management data associated with a first plurality of fixed-content objects, and the second object management component stores object management data associated with a second plurality of fixed-content objects, wherein a subset of the first plurality of fixed-content objects corresponds to a subset of the second plurality of fixed-content objects.

3. The method of claim 1, wherein the object management data comprises object lifecycle management information.

4. The method of claim 1, wherein the object management data comprises an object location.

5. The method of claim 1, further comprising storing the fixed-content object to a plurality of additional storage components.

6. The method of claim 1, further comprising storing object management data to a plurality of additional object management components and identifying at each of the additional object management components that the object management routine associated with the first object management component is authorized to make changes to the object management data associated with the fixed-content object.

7. The method of claim 1, further comprising:
storing the object management data associated with the fixed-content object to a third object management component;
identifying at the third object management component that the object management routine associated with the second object management component is authorized to make changes to the object management data associated with the fixed-content object; and
identifying at the third object management component that the object management routine associated with the third object management component is authorized to provide information related to the fixed-content object, but is not authorized to make changes to the object management data associated with the fixed-content object.

8. The method of claim 7, further comprising:
synchronizing the third object management component so that only one of the object management components is authorized to make changes to the object management data associated with the fixed-content object.

9. The method of claim 1, further comprising:
receiving at an object management component a request to make a change to the object management data associated with the fixed-content object;
determining which object management component is authorized to make the change to the object management data associated with the fixed-content object; and
forwarding the request to the object management component that is authorized to make the change.

10. The method of claim 9, wherein detecting a failure in communication occurs when forwarding the request to the object management component that is authorized to make the change fails.

11. A method of managing synchronization of one or more attributes corresponding to a stored fixed-content object, comprising:
storing a fixed-content object in at least a first storage component and a second storage component, wherein the fixed-content object stored at the second storage component is a copy of the fixed-content object stored at the first storage component;
storing, at a first object management component, object-management-information that identifies the first object management component as a primary object management component for the fixed-content object and at least a second object management component as a secondary object management component for the fixed-content object;
storing, at the second object management component, object-management-information that identifies the first object management component as the primary object management component for the fixed-content object and the second object management component as the secondary object management component for the fixed-content object;
detecting that the first object management component is no longer accessible by the second object management component; and
modifying the object-management-information stored at the second object management component to identify the second object management component as a primary object management component for the fixed-content object.

12. The method of claim 11, further comprising:
detecting that the first object management component and the second object management component are both primary object management components.

13. The method of claim 12, further comprising:
modifying the object-management-information stored at the second object management component to identify the first object management component as the primary object management component.

14. The method of claim 12, further comprising:
synchronizing an attribute stored at the second object management component with a corresponding attribute stored at the first object management component.

15. The method of claim 12, wherein detecting that the first object management component and the second object management component are both primary object management components comprises transmitting a communication from the first object management component to the second object management component and receiving in response a communication from the second object management component to the first object management component that identifies the second object management component as a primary object management component.

16. The method of claim 11, further comprising:
determining that the first object management component is accessible again by the second object management component.

17. The method of claim 16, wherein determining that the first object management component is accessible by the second object management component comprises transmitting a communication from the second object management component to the first object management component and receiving in response a communication from the first object management component to the second object management component.

18. The method of claim 16, further comprising:
synchronizing the object-management-information stored at the first and second object management components to identify one object management component as the primary object management component.

19. The method of claim 16, further comprising:
synchronizing an attribute stored at the second object management component with a corresponding attribute stored at the first object management component.

20. The method of claim 11, further comprising
modifying an attribute corresponding to the second fixed-content object that is stored at the second storage component;
determining that the first object management component is again accessible by the second object management component, and detecting that the first object management component and the second object management component are both primary object management components; and
synchronizing the modified attribute stored at the second object management component with a corresponding attribute stored at the first object management component.

21. The method of claim 11, further comprising:
storing, at a third object management component, object-management-information that identifies the first object management component as a primary object management component for the fixed-content object and the third object management component as a secondary object management component for the fixed-content object;
determining that the first object management component is not accessible by the second object management component, but the third object management component is accessible by the second object management component; and
modifying the object-management-information stored at the third object management component to identify the second object management component as the primary object management component.

22. The method of claim 21, further comprising:
determining that the first object management component is again accessible by the second object management component, and detecting that the first object management component and the second object management component are both primary object management components for the fixed-content object; and
modifying the object-management-information stored at the second object management component and the third object management component to identify the first object management component as the primary object management component for the fixed-content object.

23. The method of claim 21, further comprising modifying an attribute corresponding to the fixed-content object that is stored at the second object management component, and replicating the modified attribute to the third object management component.

24. The method of claim 11, further comprising:
storing, at a third object management component, object-management-information that identifies the second object management component as a primary object management component for the fixed-content object and the third object management component as a secondary object management component for the fixed-content object;
determining that the first object management component is again accessible by the second object management component; and
modifying the object-management-information stored at the second and third object management components to identify the first object management component as the primary object management component.

25. The method of claim 11, wherein at least one of the attributes comprises metadata information.

26. The method of claim 11, wherein at least one of the attributes comprises an object location.

27. The method of claim 11, wherein at least one of the attributes comprises object lifecycle management information.

28. The method of claim 27, wherein the lifecycle management information is selected from the group comprising notification information, placement information, caching information, and retention time enforcement information.

29. A system of maintaining objects in a distributed storage system, comprising:
a plurality of distributed storage nodes that store objects;
a plurality of distributed storage management nodes in communication with the storage nodes over a network, the storage management nodes configured to maintain management information about the stored objects;
wherein a first storage management node is configured to fulfill requests to change storage management information about an object and other storage management nodes are configured to forward requests to change storage management information about the object to the first storage management node;
wherein a second storage management node is configured to fulfill requests to change storage management information about the object upon detecting that the first storage management node is unreachable; and
wherein the first storage management node is configured to synchronize with the second storage management node upon detecting that the second storage management node is configured to receive requests from other storage management nodes.

30. The system of claim 29, further wherein the first storage management node is configured to communicate the changed storage management information to other storage management nodes.

31. The system of claim 29, wherein the second storage management node is configured to direct future requests to change storage management information about the object from other reachable storage management nodes to the second storage management node.

32. A method of maintaining fixed-content objects in a storage system, comprising:
receiving a fixed-content object to be stored in accordance with information storage management policies;
storing the fixed-content object to a plurality of storage components;
storing object management data associated with the fixed-content object to a plurality of object management components;
identifying at the plurality of object management components that the object management routine associated with any of the plurality of object management component is authorized to provide information related to the fixed-content object, but only an object management routine associated with a first object management component is authorized to make changes to the object management data associated with the fixed-content object; and after detecting the first object management component is no longer accessible, identifying at one or more of the remaining plurality of object management components that an object management routine associated with a second object management component is authorized to make changes to the object management data associated with the fixed-content object.

33. The method of claim 32, further comprising detecting the first object management component is again accessible and synchronizing the first object management component and the second object management component so that only one of the object management components is authorized to make changes to the object management data associated with the fixed-content object.

34. The method of claim 32, further comprising detecting the second object management component is no longer accessible and identifying at one or more of the remaining plurality of object management components that an object management routine associated with a third object management component is authorized to make changes to the object management data associated with the fixed-content object.

35. The method of claim 32, wherein the first object management component is no longer accessible because of a network communication failure.

36. The method of claim 32, wherein the first object management component is no longer accessible because the first object management component is offline.

37. The method of claim 32, wherein the first object management component is no longer accessible because the first object management component was removed from the storage system.

38. A method of maintaining fixed-content objects in a storage system, comprising:

receiving a fixed-content object to be stored in accordance with information storage management policies;

storing the fixed-content object to a plurality of storage components;

storing object management data associated with the fixed-content object to a plurality of object management components;

identifying at the plurality of object management components that the object management routine associated with any of the plurality of object management component is authorized to provide information related to the fixed-content object, but only an object management routine associated with a first object management component is authorized to make changes to the object management data associated with the fixed-content object; and identifying at the plurality of object management components that only an object management routine associated with a second object management component is authorized to make changes to the object management data associated with the fixed-content object after determining that it is not optimal to use the first object management component to make changes to the object management data.

39. A computer storage medium having stored therein instructions for causing a processor to execute a method of maintaining fixed-content objects in a storage system, comprising:

receiving a fixed-content object to be stored in accordance with information storage management policies;

storing the fixed-content object to a first storage component;

storing object management data associated with the fixed-content object to a first object management component;

identifying at the first object management component that an object management routine associated with the first management component is authorized to make changes to object management data associated with the fixed-content object;

storing the fixed-content object to at least a second storage component;

storing the object management data associated with the fixed-content object to at least a second object management component;

identifying at the second object management component that the object management routine associated with the first object management component is authorized to make changes to the object management data associated with the fixed-content object;

identifying at the second object management component that the object management routine associated with the second object management component is authorized to provide information related to the fixed-content object, but is not authorized to make changes to the object management data associated with the fixed-content object;

identifying at the first object management component that the object management routine associated with the second object management component is authorized to provide information related to the fixed-content object, but is not authorized to make changes to the object management data associated with the fixed-content object;

after detecting a failure in communication between the first object management component and the second object management component, identifying at the second object management component that an object management routine associated with the second object management component is authorized to make changes to the object management data associated with the fixed-content object; and after detecting restoration of communication between the first object management component and the second object management component, synchronizing the first object management component and the second object management component so that only one of the object management components is authorized to make changes to the object management data associated with the fixed-content object.

40. The computer storage medium of claim 39, wherein the first object management component stores object management data associated with a first plurality of fixed-content objects, and the second object management component stores object management data associated with a second plurality of fixed-content objects, wherein a subset of the first plurality of fixed-content objects corresponds to a subset of the second plurality of fixed-content objects.

41. The computer storage medium of claim 39, wherein the object management data comprises object lifecycle management information.

42. The computer storage medium of claim 39, wherein the object management data comprises an object location.

43. The computer storage medium of claim 39, the method of maintaining fixed-content objects further comprising storing the fixed-content object to a plurality of additional storage components.

44. The computer storage medium of claim 39, the method of maintaining fixed-content objects further comprising storing object management data to a plurality of additional object management components and identifying at each of the additional object management components that the object management routine associated with the first object management component is authorized to make changes to the object management data associated with the fixed-content object.

* * * * *